Figure 1:
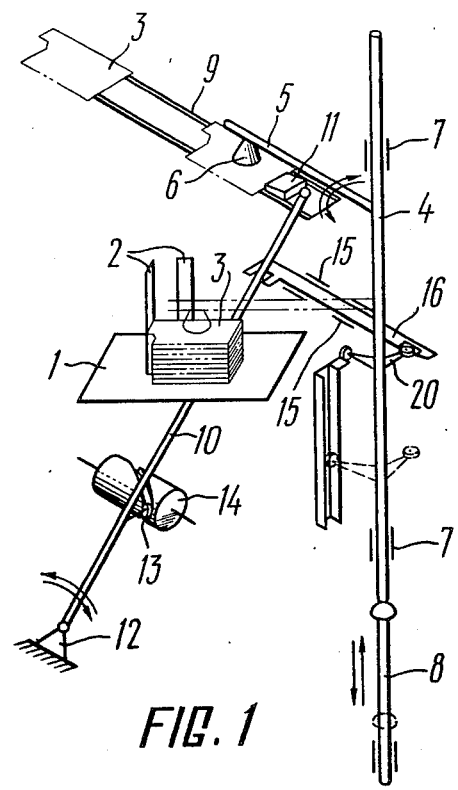

United States Patent [19]

Kolosov et al.

[11] 4,139,105

[45] Feb. 13, 1979

[54] DEVICE FOR PIECE-BY-PIECE DELIVERY OF STORAGE-CELL ELECTRODES

[76] Inventors: Ivan A. Kolosov, ulitsa Astrakhanskaya, 118, kv. 54; Jury E. Ivanyatov, ulitsa M. Zatonskaya, 21, both of Saratov; Mikhail M. Dychkin, ulitsa Lomonosova, 22, kv. 29, Engels Saratovskoi oblasti, all of U.S.S.R.

[21] Appl. No.: 774,732

[22] Filed: Mar. 7, 1977

[51] Int. Cl.² ............................................. B65G 59/04
[52] U.S. Cl. .............................. 214/8.5 D; 214/1 BH; 271/14; 271/269
[58] Field of Search .............. 214/8.5 D, 8.5 C, 1 BB, 214/1 BC, 1 BT, 1 BH, 1.5, 1.6; 271/11, 14, 15, 107, 267, 268, 269

[56] References Cited

U.S. PATENT DOCUMENTS

| | | | |
|---|---|---|---|
| 2,652,161 | 9/1953 | Herzig et al. | 214/8.5 D |
| 2,842,832 | 7/1958 | Chase et al. | 214/1 BH |
| 2,950,829 | 8/1960 | McBean et al. | 214/1 BH |
| 3,221,910 | 12/1965 | Izumi | 214/1 BH |
| 3,857,496 | 12/1974 | Bonzales | 214/1 BT |

FOREIGN PATENT DOCUMENTS 1,366,316   6/1964   France ................................. 214/1 BT

*Primary Examiner*—Albert J. Makay
*Assistant Examiner*—Ross Weaver
*Attorney, Agent, or Firm*—Lackenbach, Lilling & Siegel

[57] ABSTRACT

A device for a piece-by-piece delivery of storage-cell electrodes is described which includes a table on which a stack of electrodes is disposed. Located close to the table is a manipulator made as a swivel bar with a holder at a end of which a gripper is provided. The swivel bar is mounted in sliding bearings coaxially with a pushrod which is capable of vertical reciprocations so as to lift the bar and dro it freely under its own weight. Provision is made in the middle portion of the bar for the double-arm lever with the rollers, the lever being kinematically associated with the link of a step-by-step conveyor. The link has a right-angular recess the outside working edge of which is shorter than the inside working edge thereof, thus providing for the link to engage one of the rollers of the double-arm lever in the course of swivelling of the bar.

4 Claims, 2 Drawing Figures

DEVICE FOR PIECE-BY-PIECE DELIVERY OF STORAGE-CELL ELECTRODES

The present invention relates to the field of production of storage batteries and has particular reference to a device for a piece-by-piece delivery of storage-cell electrodes which are used in the feeder of battery assembling machines, such as an automatic electrode sorting-out machine, automatic machine for packing electrodes into a separating material, and in some other automatic machine used in of an automated storage-battery assembling line.

The proposed device can be used to produce any items which include flat components and which requires automating sorting-out, packing and some other operations.

The invention can find most utility and be used with a maximum efficiency when applied for automation of assembly operations in the production of higher power capacity Ni-Cd batteries which comprise extra-thin electrodes featuring very low stiffness and strength, e.g., ones applicable for aviation or automobile batteries, etc.

The problem of automating assembly operations in production of storage batteries, which include extra-fine electrodes, resides in that small thickness and inadequate strength of such electrodes preclude the application, for the purpose of such widely known and extensively employed (e.g., in producing lead-acid batteries) devices, of piece-by-piece loading of electrodes into assembling machines by successively putting them into the working members of such machines.

That is why the majority of assembly operations involved in production of higher power capacity batteries are performed either manually or on man-assisted equipment involving manual loading of workpieces into the working members of the machine.

As far as one s knowledge goes, no automatic devices for piece-by-piece loading of extra-fine low-strength electrodes into assembling machines are known or being used commercially in any country.

One prior-art device is known for piece-by-piece delivery of storage-cell plates, wherein the plates are fed into the working members of the machine by advancing them along guides (cf., e.g., USSR Inventor's certificate No. 358,739, 1971, Class H01m 37/00, H01m 35/00), includes a feed magazine for to accomodate a stack of plates to accommodate, and a gate mechanism made as a step-by-step conveyor located in the bottom portion of the feed magazine and adapted to deliver one plate per working stroke of the gate mechanism which reciprocates horizontally in cooperation with the bottom plate of the stack of plates. However, the device functions reliably only when the plates are at least one-millimeter thick and have regular, even and strong enough edges. Thus, on that account the device cannot be applied for feeding extra-fine low-strength electrodes.

Also known in the prior art are also mechanisms for feeding plates and separators from bins to the place of assembly by using vacuum catches which take the plates one by one from the top of the stack in the bin and put them into a stack at the place of assembly, these mechanisms being useful in assembling devices for clustered cells (cf., e.g., U.S. Pat. No. 935,374 of the German Federal Republic, 1949, Class 21Kg 37/00, and USSR Inventor's Certificate No. 125,587, 1960, Class H01m 37/00), and include a vacuum catch (suction head) located on a cam-and-lever manipulator provided with a handling bar and capable of vertical reciprocations over the stack of plates in the feeder to catch the top plate of the stack, and capable of horizontal movement to carry the plate from the feeder to the assembling station and place it into the stack at the place of assembly.

In addition, the catch is located at the end of the handling bar of the cam-and-lever manipulator, the bar moving down onto the stack of plates under its own weight.

However, the aforementioned mechanisms are devoid of members for horizontally advancing of electrodes along the guides and are therefore inapplicable for push-feeding of electrodes into the working members of the machines, e.g., for loading electrodes into an automatic machine for packing electrodes into a separating material, electrode thickness classifying machine, etc. Application of separate devices for push-feeding of electrodes into the working members complicates the machine and fails to render the device for piece-by-piece delivery of cell electrodes adequately mobile.

It is an object of the present invention to provide a simple and reliable device for piece-by-piece delivery of extra-thin low-strength cell electrodes and push-feeding them into the working members of the machine without any substantial deformation of the electrodes.

It is another object of the present invention to automate the assembly operations involved in the production of storage-battery cells.

These and other objects are accomplished due to the fact that in a device for piece-by-piece delivery of storage-cell electrodes, comprising a table whereon a stack of electrodes is disposed, a manipulator is located close to said table and made as a swivel bar provided with a holder at the end of which a gripper is fixed. A step-by-step conveyor with a link is provided and, according to the invention, the swivel bar is provided with a pushrod arranged coaxially therewith and adapted to lift the swivel bar upon being urged to move upwards by an actuator and drop freely under its own weight. A double-arm lever carries rollers and is kinematically associated with the link of the step-by-step conveyer, said link having a right-angular recess, wherein an outside working edge is made shorter than an inside working edge thereof, thus providing for the link to engage the roller of the double-arm lever upon swivelling of the bar.

The device for piece-by-piece delivery of storage-cell electrodes, according to the present invention brings automation in the assembling operations involved in the production of, say, Ni-Cd storage cells featuring higher power capacity and comprising extra-fine low-strength electrodes, by virtue of the fact that the electrode gripper is mounted on a swivel bar adapted to move down under its own weight, thus exerting constant pressure upon the electrodes whatever the height of the stack, whereas the bar is swivelled owing to the interaction of its double-arm lever with the recess in the link of the step-by-step conveyer, thus ensuring the delivery of the electrode by the latter by way of pushing the electrode by its end along the guide strips of the step-by-step conveyor which rules out any possibility of deformation of the electrodes when being pushed into the working members of the automatic machine.

The above-described swivel of the bar by the link of the step-by-step conveyor by virtue of interaction of the edges of the right-angular recess in the link with the roller of the swivel bar double-arm lever adds much to the simplicity of the entire device and enables it to be used for automation of electrode loading into the now-existing man-assisted assembling machines.

Simple construction and reliable operation of the proposed device makes it possible to make extensive application of the device in the production of any items, which include flat components for automatically sorting-out, packing and some other operations.

Figure 2:
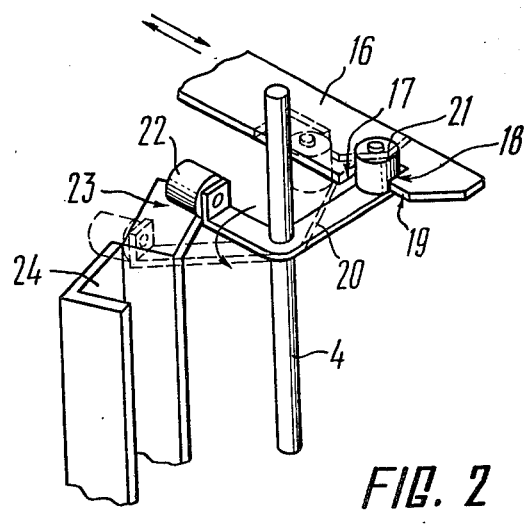

Described below is an exemplary embodiment of the present invention to be read in conjunction with the accompanying drawings, wherein:

FIG. 1 is a functional diagram of the device for piece-by-piece delivery of storage-cell electrodes; and FIG. 2 is a mechanical diagram of engagement of the link and the roller of the double-arm lever.

Referring now to the accompanying drawings, FIG. 1 illustrates a table 1 of the device for piepe-by-piece delivery of storage-cell electrodes of the present invention, whereon vertical ledges 2 are provided to restrict the stack of electrodes 3 from the sides. Located close to the table 1 is a manipulator, comprising a swivel bar 4 provided with a holder 5 the end of which carries a gripper 6, made as, say, a vacuum cup. The swivel bar 4 is mounted in sliding bearings 7 coaxially with a pushrod 8 which reciprocates vertically by, say, a cam of an actuator (not shown). Guide strips 9 of the step-by-step conveyor make up an angle (say, 15°) with the end surface of the table 1.

The step-by-step conveyor also includes a lever 10 provided with a pushrod 11 at one of its ends and with a swing bearing 12 at the other end, said lever being arranged in the same plane with the guide strips 9 and performing swinging motions in that plane.

The bottom portion of the lever 10 carries a roller 13 located above the swing bearing 12. A cylindrical cam 14 is located at the level of the roller 13, the shaft of said roller being located in the plane parallel to the plane of swinging motions of the lever 10. Interaction of the roller 13 with the recess in the cam 14 occurring when the latter is rotating, imparts reciprocations to the pushrod 11 along the guide strips 9.

Set on a common shaft with the cam 14 is a cam imparting vertical reciprocations to the pushrod 8.

A link 16 (FIGS. 1, 2) is mounted in bearings 15 in the plane of swinging motions of the lever 10, one end of said link being movable interconnected with the lever 10, while the other end has a right-angular recess which features an inside working edge 17 (FIG. 2) and an outside working edge 18 and arranged normally therewith is an edge 19. A double-arm lever 20 is fixed in position on the bar 4 (FIG. 1) in the middle portion thereof at the level corresponding to the level at which the link 16 is situated when the bar assumes its topmost position. One arm of the double-arm lever 20 (FIG. 2) carries a roller 21 set on a vertical shaft and adapted to cooperate with the working edges 17, 18, 19 of the right-angular recess in the link 16 when the bar 4 is in the topmost position, thus urging the bar 4 to rotate about its own axis. The other arm of the double-arm lever 20 bears a roller 22 whose shaft is located at right angles with respect to the shaft of the roller 21. When swivelling in the topmost position the bar 4 rests with the roller 22 upon a horizontal seat 23 of a U-shaped guide 24 the slot of which is arranged vertically on the pathway of the roller 22 in which the latter moves along when the bar 4 drops under its own weight making way after the descending pushrod 8 (FIG. 1).

The device for piece-by-piece delivery of storage-cell electrodes, according to the present invention, functions as follows. The bar 4 initially assumes the topmost position. The roller 21 (FIG. 2) of the double-arm lever 20 is so located at that instant that the link 16, which returns into the initial position after having fed the electrode 3 by the lever 10 (FIG. 1) carrying the pushrod 11, passes by the roller 21 (FIG. 2) touching its surface by the edge 19 as far as it thrusts against the working edge 17 which is longer than the working edge 18.

Upon further motion of the link 16 the working edge 17 urges the lever 20 to turn into the rightmost position. While turning the lever 20 also causes turning of the bar 4 with the holder 5 (FIG. 1) and the gripper 6 which carries the electrode 3, thus laying the latter into the guide strips 9 of the step-by-step conveyor.

It is expedient that the gripper 6 be disengaged under the action of an external stop, or be made as a chamber operative from a vacuum pump. In this case the holder 5 and the bar 4 are advantageous made hollow, the hosepipe from the vacuum pipe being connected to the union provided in the bottom portion of the bar 4 and a control valve being provided between the union and the gripper 6 so as to shut off the interior of the bar 4 and communicate the gripper chamber with the atmosphere under the action of the external stop.

One more embodiment of the grippers 6 is also practicable, viz., as magnets or solenoids, etc. adapted to be deenergized at the moment of laying down the electrodes upon the step-by-step conveyer.

The step-by-step conveyer may also be made in a number of embodiments, say, as a rack-and-pinion drive, since it is essential that the link perform reciprocating motion for the bar to turn.

Once an electrode 3 has been placed between the strips 9 ahead of the pushrod 11 when the latter assumes the rearmost position, the lever 10 starts advancing, thus pushing the electrode 3 by the pushrod 11 along the guide strips 9 into the working members of the machine. At the same time the link 16 moves to drag with its outside edge 18 (FIG. 2) the roller 21, thus causing the bar 4 to turn along with the gripper 6 to the leftmost position. In this case the extreme position of the gripper 6 over the step-by-step conveyor is defined by the length of the link 16 between the working edge 17 and the point of its connection to the lever 10, while the angle of turning of the gripper 6 into the leftmost position depends upon the position of the edge 19 which in turn is defined by the difference between the lengths of the edges 17 and 18 and their position relative to the roller 21.

On that account is it appropriate that the link 16 should be made adjustable for length and the position of its recess with respect to the axis of rotation of the bar 4 be variable in the course of set-up operations.

Once the gripper has reached the leftmost position, the roller 21 (FIG. 2) gets disengaged from the recess along the working edge 19, while the roller 22 stops above the slot of the U-shaped guide 24. At that moment the pushrod 8 (FIG. 1) starts moving down, the bar 4 makes its way down thereafter under its own weight until the gripper 9 abuts itself the level of the stack of electrodes, whereupon the bar 4 stops moving while resting upon the stack with the grip 6.

When the pushrod 8 moves up its spherical support comes in contact with the end of the bar 4 to lift the latter along with the electrode 3 carried by the gripper 6, into the topmost position. At the same time the lever 10 returns into the initial position and the link 16 with its recess engages the roller 21 (FIG. 2), thus urging the bar 4 (FIG. 1) to turn to the rightmost position of the gripper 6. As a result the electrode 3 moves down onto the guide strips 9 of the step-by-step conveyer, whereupon the entire cycle is repeated.

It is favourable to impart all motions by means of cams set on a common shaft associated with a common drive of the machine, wherein the present device is made use of.

Application of a self-contained drive would render it more difficult to coordinate the working cycle of the device with that of the entire machine.

The device for piece-by-piece delivery of storage-cell electrodes, according to the present invention provides for automation of many assembly operations involved in the production of storage cells comprising extra-thin low-strength electrodes, which is attained due to the fact that the manipulator is made as a swivel bar 4 provided with the gripper 6 and adapted to freely move down upon the stack of the electrodes 3 under its own weight, is operatively associated with the step-by-step conveyer through the double-arm lever 20 adapted to cooperate with the recess in the link 16 through the rollers 21, 22 and the working edges 17, 18, 19 of said recess, thus lifting and transferring the electrodes 3 piece-by-piece from the top of the stack and advancing the same by the pushrod 11 of the step-by-step conveyer into the working members of the machine wherein the device is made use of, without any substantial deformation of the electrodes.

Turning of the bar 4 during the manipulator working stroke, by means of the link 16 of the step-by-step conveyer which occurs upon interaction of the working edges 17, 18, 19 with the roller 21 of the swivel bar 4, adds to the simplicity of the device, renders it mobile. This, in turn, makes the device suitable for automating the loading of the electrodes 3 into the now-existing man-assisted machines.

What is claimed is:

1. A device for piece-by-piece delivery of storage-cell electrodes and the like, comprising: a table adapted to support a stack of electrodes; a manipulator located close to said table and made as a swivel bar provided with a holder, and a gripper of said manipulator fixed in place at the end of said holder; a double-arm lever with rollers, said lever being locked in place substantially in the middle portion of said bar; a pushrod coaxial with said swivel bar and adapted to lift said bar and permit said bar to move down freely under the weight of said bar when not supported by said push/rod; a step-by-step conveyor; a link which is kinematically associated with said double-arm lever and said conveyor, said link having a recess arranged to engage one of said rollers of said double-arm lever during swivelling of said bar whereby upon actuation of said step-by-step conveyor said link rotates said bar causing movement of said gripper between positions over said stack and said conveyor.

2. A device as defined in claim 1, wherein said recess has an outside working edge which is shorter than an inside working edge thereof.

3. A device as defined in claim 1, further comprising a vertical guide having a U-shaped channel adapted to receive one of said rollers during downward movement of said bar.

4. A device as defined in claim 1, further comprising an actuator lever pivotally mounted at one end and being connected to said pushrod at the other end, said link being coupled to said actuator lever at an intermediate portion thereof; and cam means associated with said actuator lever for reciprocating said pushrod and said link and thereby also rotate said swivel bar when said actuator lever pivots about said one end thereof.

* * * * *